United States Patent
Strocchi

[11] Patent Number: 5,913,906
[45] Date of Patent: Jun. 22, 1999

[54] FOLDING ANTI-THEFT DEVICE

[75] Inventor: Gian Franco Strocchi, Lugo, Italy

[73] Assignee: I.P. Innovative Products S.r.l., Lugo, Italy

[21] Appl. No.: 08/886,658

[22] Filed: Jul. 1, 1997

[51] Int. Cl.[6] .................................................. E05B 71/00
[52] U.S. Cl. ..................... 70/18; 59/78; 59/93; 70/49; 70/53; 70/58; 70/233
[58] Field of Search ................... 70/18, 30, 49, 70/53, 58, 233; 59/93, 78

[56] References Cited

U.S. PATENT DOCUMENTS

| | | | |
|---|---|---|---|
| 557,522 | 3/1896 | Blake | 70/49 |
| 558,814 | 4/1896 | Hunt | 70/49 |
| 589,861 | 9/1897 | Schroeder | 70/18 |
| 3,747,376 | 7/1973 | White, Jr. | 70/18 |
| 4,505,140 | 3/1985 | Solow | 70/18 X |
| 4,760,718 | 8/1988 | Muramatsu et al. | 70/18 |
| 5,018,374 | 5/1991 | Montano | 70/233 |
| 5,076,531 | 12/1991 | Delaney | 70/58 X |
| 5,475,993 | 12/1995 | Kuo | 70/18 |
| 5,487,285 | 1/1996 | Leichel et al. | 70/18 |

FOREIGN PATENT DOCUMENTS

| | | | |
|---|---|---|---|
| 638473 | 2/1995 | European Pat. Off. . | |
| 689987 | 1/1996 | European Pat. Off. . | |
| 335862 | 4/1921 | Germany | 70/18 |
| 1008599 | 5/1957 | Germany | 70/53 |
| 93 07 702 | 7/1993 | Germany . | |
| 15351 | of 1888 | United Kingdom | 70/49 |

*Primary Examiner*—Lloyd A. Gall
*Attorney, Agent, or Firm*—Fay, Sharpe, Beall, Fagan, Minnich & McKee

[57] ABSTRACT

An anti-theft device includes two groups of elements, each group being composed of a plurality of elements flexibly joined to each other by offset cylindrical joints; both of the groups are flexibly joined at one end to a central link, and are fitted with a disengageable fastener at the opposite end; when used, the opposite ends of the device are fastened to each other to form a closed loop round an object that is to be secured against theft; the fastener is designed to keep the device locked in its closed loop configuration so as to prevent unauthorized breaking of the loop; when not used, the device can be folded up into a neat, compact configuration in which the two groups of elements are folded up and arranged side by side.

15 Claims, 2 Drawing Sheets

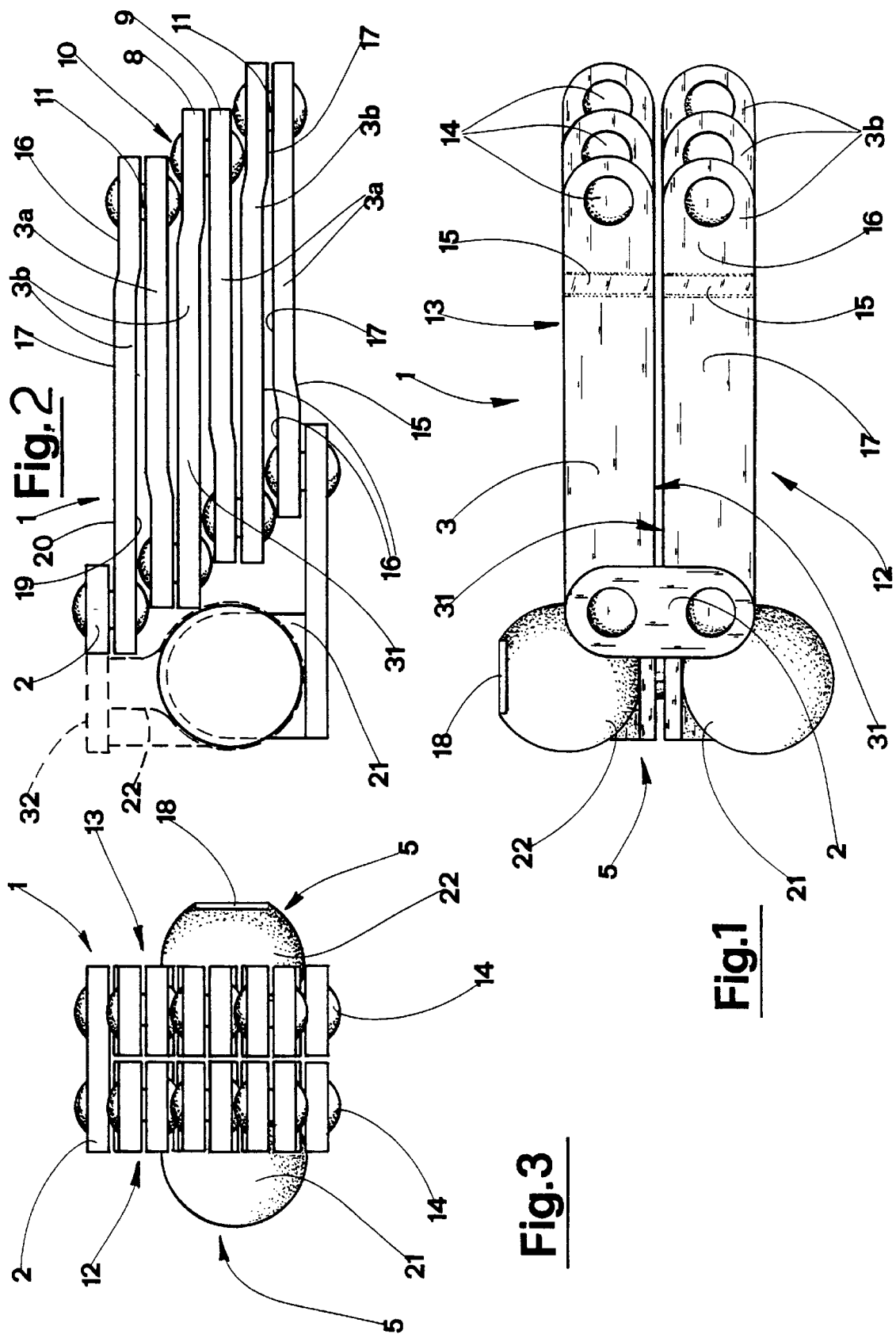

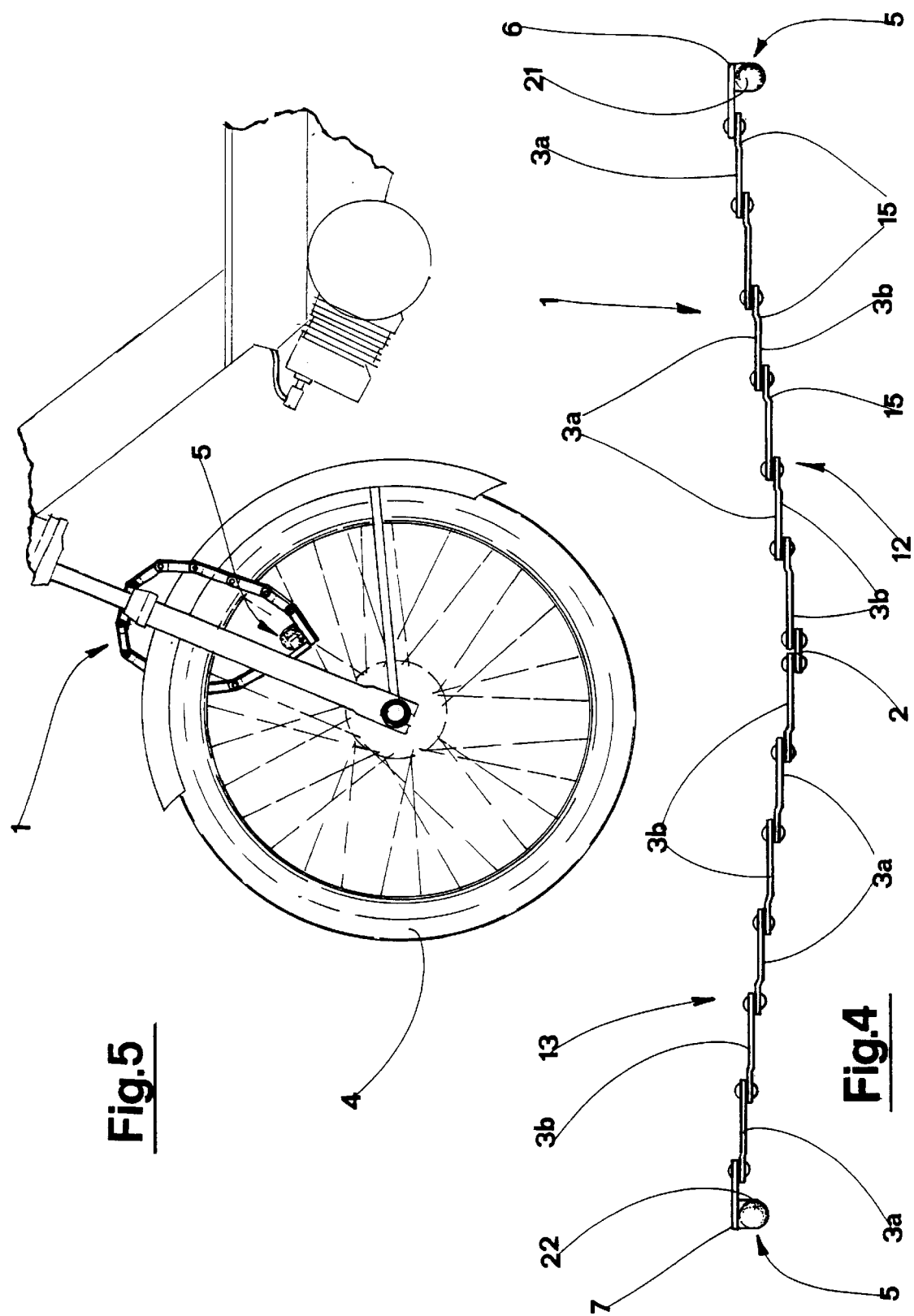

FOLDING ANTI-THEFT DEVICE

BACKGROUND OF THE INVENTION

The present invention relates to a folding anti-theft device, in particular for bicycles and motorcycles. It can be conveniently used especially, but not exclusively, to protect bicycles, motorcycles and similar objects against theft or at least to discourage would-be thieves; moreover, the device is of the type that can be folded up when not used to assume a neat, compact configuration that occupies a minimum of space. Basically, the device concerned immobilizes a movable object by tying or fixing it or part of it to an immovable object securely enough to prevent or discourage theft.

Similar devices of this kind have been known and used for the same purpose for a long time and consist substantially of chains and locks sufficiently strong to resist attempts to break them by would-be thieves.

Folding anti-theft devices are also known; that is to say, devices which, when not in use, can be folded up into a compact shape occupying very little space and being easy to carry and to stow away, for example in specially made compartments on motorcycles.

The aim of the present invention is to provide a folding anti-theft device of the kind described above which, in its folded configuration, is extremely compact and occupies a minimum amount of space.

One advantage of the device disclosed is that it is at once very simple and economical in construction, easy to use and practical.

A further advantage is that it is particularly strong and resistant to attempts to break it.

Yet another advantage is that while its extended configuration is equal in length to that of known devices, its folded up configuration is much more compact and smaller in size.

SUMMARY OF THE INVENTION

These and other aims and advantages are achieved by the device disclosed as characterized in the claims below. Basically, the device comprises a plurality of elements joined together in a chain with non-rigid joints such that the device can be looped round an object, for example, the wheel of a motorcycle; a lock is also envisaged to close the loop and keep the opposite ends of the device securely locked together.

BRIEF DESCRIPTION OF THE DRAWINGS

Further characteristics and advantages of the invention are apparent from the detailed description which follows, with reference to the accompanying drawings, which illustrate preferred embodiments of the invention and in which:

FIG. 1 is a top, plan view of the device disclosed in its fully folded up configuration;

FIG. 2 is a side view from below of the device shown in FIG. 1;

FIG. 3 is a side view from the right of the device shown in FIG. 1;

FIG. 4 is a scaled-down view of the device viewed from the same side as in FIG. 3 but in its fully unfolded configuration;

FIG. 5 is a perspective view showing the device disclosed in a working configuration in which it is applied to a wheel 4 of a motorcycle.

DESCRIPTION OF THE PREFERRED EMBODIMENTS

With reference to the above drawings, the numeral 1 indicates a folding anti-theft device comprising two identical groups 12 and 13 of elements, each group being composed of a plurality of elements, labelled 3a and 3b, joined together in a chain. In the preferred embodiment described here, each of the groups 12 and 13 is made up of six elements 3a and 3b.

Each of the elements 3a and 3b consists of a flattened, elongated plate whose two opposite faces 19 and 20 are substantially plane and parallel to each other.

In addition, each of the elements 3a and 3b is connected at one end 8 to the end 9 of the next element by means of a cylindrical offset joint 10 which allows the element to rotate freely round the other element about a pin 11 perpendicular to the elements 3a and 3b. The planes in which the elements 3a and 3b lie are substantially parallel to each other and the corresponding pins 11 are also parallel to each other.

Each of the groups 12 and 13 has at one end of it a lock element connected to it by means of a cylindrical offset joint like the one between two adjacent elements 3a and 3b; in the drawings, the lock elements are labelled 21 and 22, respectively. Each of the lock elements 21 and 22 is composed of a flattened, elongated plate parallel to the elements 3a and 3b of the corresponding group. At the ends opposite the articulated ends, the lock elements 21 and 22 are fitted with disengageable fastening means 5, of known kind and preferably including a lock 18.

The two groups 12 and 13, at the ends opposite the ends with the lock elements 21 and 22, are connected to each other through a central link 2. The link 2 also has a flattened shape but is shorter than the elements forming the groups 12 and 13—the elements 3a and 3b and the link 2 all being approximately equal in thickness. Preferably, the link 2 is approximately twice as long as the elements 3a and 3b are wide.

The link 2 has a cylindrical offset joint at each end, the pins 11 of these joints protruding from the same face of the link. These joints attach the link 2 to the groups 12 and 13 which are arranged on the same side of the link 2. Each of the groups 12 and 13 is thus flexibly joined to one end of the link 2. The two elements joined to the link 2, one in each group 12, 13, are located at the ends opposite the ends with the corresponding lock elements 21 and 22.

In short, the device 1, from one end to the other, consists of the following parts, joined together in a chain: a locking element 21, a group 12 of elements 3a and 3b, the central link 2 (preferably located exactly in the middle of the chain), the other group 13 of elements 3a and 3b and, lastly, the other lock element 22.

Each of the groups 12 and 13 of elements can assume a folded configuration, illustrated in FIGS. 1 to 3, in which the various elements 3a and 3b are arranged one over the other, face to face, with a small space between one face and another. This configuration is achieved by rotating each element about the corresponding joint 10.

The two groups 12 and 13 can be rotated about the joint on the link 2 in such a way as to be arranged, as shown in FIGS. 1 to 3, side by side at a very short distance from each other.

Thanks to the presence of the link 2 and to the fact that the two groups 12 and 13 of elements are both on the same side of the link, the device 1, in its folded configuration, assumes an extremely compact, practical shape, occupying little space, and thus becomes easy to carry and to stow away, for example in specially made compartments on motorcycles.

The joints 10 are fitted preferably by riveting the pins 11, so that each pin 11 presents at each end a head 14 protruding from one face of the elements coupled to the pin itself.

Each of the groups 12 and 13 of elements includes two different types of elements, that is to say, short elements, labelled 3a, and long elements, labelled 3b, differing from each other on account of the different distance between their end pins 11. The short elements 3a alternate with the long elements 3b, so that when they are folded, the elements take on a characteristic stepped shape; this stepped pattern is clearly visible in FIG. 2. In the preferred embodiment being described, each of the groups 12 and 13 consists of a series of three short elements 3a alternated with three long elements 3b. All the short elements 3a are identical, as are all the long elements 3b. In other embodiments of the invention, the number of elements 3a and 3b may be different from that stated above.

Preferably, the pins of a short element 3a are closer together than the pins of a long element 3b by an amount approximately equal to the diameter of the head 14 of a pin, so that when folded, the heads 14 of the pins 11 of adjacent elements do not interfere with each other. This makes it possible to further reduce the size of the device 1 when it is folded and is clearly illustrated in FIG. 2.

Each face of each of the elements 3a and 3b presents a step 15 which is arranged crossways with respect to the element and which defines and separates two surfaces, namely, a first surface 16 and a second surface 17, substantially plane and parallel to each other but not co-planar. With reference to any of the faces 19 and 20 of any element 3a and 3b, the first surface 16 of a face of an element is the one situated on the side of the face from which a head 14 of a pin 11 protrudes, while the second surface 17 is that from which the central portion of a pin 11 protrudes.

The steps 15 are shaped and arranged in such a manner that, when the groups 12 and 13 are folded, the first surfaces 16 of the opposite faces of two adjacent elements 3a and 3b are spaced far enough apart to leave a gap large enough to contain a head 14 of a pin 11, while the second surfaces 17 are very close together, almost touching (see FIGS. 2 and 3). This makes it possible to reduce even further the space occupied when the groups 12 and 13 are folded and, consequently, the size of the device 1 as a whole when it is folded up. The device 1 can assume a working configuration (FIG. 5) in which it is unfolded and closed in a loop round an object that is to be secured against theft. FIG. 5 shows the device 1 looped round the wheel 4 of a motorcycle.

Obviously, the various component parts of the device are strong enough to resist breaking by would-be thieves.

The fastening means 5 are designed to join the two opposite ends 6 and 7 of the chain of elements forming the device 1. The fastening means 5 are used, as is known, to keep the body 2 of the device locked in its closed loop working configuration, preventing unauthorized persons from opening it.

In another embodiment of the invention, which is not illustrated, the fastening means include a lock designed to securely join the two end elements, each of which has an integral ring which enables them to be locked to each other.

Yet another embodiment of the invention is illustrated partially in FIG. 2. In this embodiment, the device consists of a single group composed of a series of elements 3a and 3b joined together in a chain by means of the aforesaid pins 11, but the fastening means 5 are envisaged on the end elements (3b at one end and 3a at the other). Instead of the link 2, the element 3b at the top envisages a rod 32 that can be rotated and whose free end envisages one of the two lock elements 22, offset and extending downwards in such a way that when the device is folded up, it matches the other lock element 21 to which it can be fastened thanks to the action of the lock 18 (this embodiment is illustrated partially with the aid of the broken line in FIG. 2).

For reasons of practical application, the invention described can be subject to numerous modifications and variations in the details of its construction but without thereby departing from the scope of the inventive concept.

What is claimed:

1. A folding anti-theft device comprising:
   two groups of plural elements, each element having first and second opposite faces, the elements of each group joined together end to end in a chain by joints and adapted for assuming a folded configuration wherein the plural elements of each group are arranged one above the other in a stack so that each of the plural elements lies in a different plane from each of the other elements of the group, and such that, when said anti-theft device is folded, the two stacked groups are placed side by side;
   fastening means connected to an element at a first end of each of the two groups for selectively connecting the first ends of the groups together; and,
   a central link interconnecting the two groups, said central link connected at opposite ends thereof to an element at a second end of each group, opposite the first end of each group, so that when the device is folded during non-use, the two groups are arranged side by side.

2. The device according to claim 1, wherein the central link is attached to the two groups through offset joints including pins protruding from the same side of the central link parallel to each other.

3. The device according to claim 2 wherein the central link is approximately as long as the two groups of elements together are wide when they are folded and arranged side by side.

4. The device according to claim 2 wherein the first and second opposite faces of each element each comprise first and second flattened portions that are substantially plane and parallel to each other.

5. The device according to claim 1 wherein the central link is approximately as long as the two groups of elements together are wide when they are folded and arranged side by side.

6. The device according to claim 5 wherein the first and second opposite faces of each element each comprise first and second flattened portions that are substantially plane and parallel to each other.

7. The device according to claim 1 wherein the first and second opposite faces of each element each comprise first and second flattened portions that are substantially plane and parallel to each other.

8. The device according to claim 7 wherein each of the plural elements of each group is joined at opposite ends to an end of a next related element through a cylindrical offset joint that is substantially perpendicular to the faces of the elements connected so that each of the plural elements includes two joints associated therewith.

9. The device according to claim 8 wherein, of the two joints associated with each of the elements, one connects the first face of the element to the second face of a next related element and the other connects the second face of the element with the first face of a different next related element.

10. The device according to claim 8 wherein each joint associated with the elements has a pin with two fastening heads opposite each other.

11. The device according to claim 10 wherein:
    each of the groups of elements includes short elements and long elements differing from each other on account of the different distance between their joint pins, the short elements alternating with the long elements, wherein the pins of a short element are closer together than the pins of a long element by an amount approximately equal to the diameter of the head of a pin, so that when folded, the heads of the pins of adjacent elements do not interfere with each other.

12. The device according to claim 10 wherein:

the first and second opposite faces of each of the elements comprises a step which defines and separates two surfaces in each face, which are not co-planar and consisting of a first surface, from which a head of a pin protrudes, and a second surface, from which a pin protrudes, wherein the steps are shaped and arranged in such a manner that, when the elements of the groups are folded, at least a portion of the facing surfaces of two adjacent elements are spaced far enough apart to leave a gap large enough to contain at least one of the heads protruding from the facing surfaces.

13. The device according to claim 9 wherein each joint associated with the elements has a pin with two fastening heads opposite each other.

14. The device according to claim 11 wherein:

the first and second opposite faces of each of the elements comprises a step which defines and separates two surfaces in each face, which are not co-planar and consisting of a first surface, from which a head of a pin protrudes, and a second surface, from which a pin protrudes, wherein the steps are shaped and arranged in such a manner that, when the elements of the groups are folded, at least a portion of the facing surfaces of two adjacent elements are spaced far enough apart to leave a gap large enough to contain at least one of the heads protruding from the facing surfaces.

15. The device according to claim 1, wherein said fastening means further comprises a lock.

\* \* \* \* \*